United States Patent [19]

Sherman et al.

[11] 4,297,311
[45] Oct. 27, 1981

[54] METHOD OF MANUFACTURING IMPROVED MINERAL BOARD

[75] Inventors: Norman Sherman, Ramsey; John H. Cameron, St. Paul, both of Minn.

[73] Assignee: Conwed Corporation, St. Paul, Minn.

[21] Appl. No.: 85,501

[22] Filed: Oct. 17, 1979

Related U.S. Application Data

[63] Continuation of Ser. No. 967,217, Dec. 7, 1978, abandoned.

[51] Int. Cl.³ .............................................. B29J 1/00
[52] U.S. Cl. ................................... 264/109; 264/115; 264/120; 264/122; 428/524; 428/920; 428/702; 162/152; 162/166; 162/167; 428/310; 264/87;109;115;119;120
[58] Field of Search ............... 162/152, 166, 167, 171, 162/181; 428/214, 524, 538, 920

[56] References Cited

U.S. PATENT DOCUMENTS 2,325,302  7/1943  Britt .................................... 162/166
2,626,864  1/1953  Miscall et al. ...................... 162/152
3,494,824  2/1970  Roberts .............................. 162/152

OTHER PUBLICATIONS

Zukov et al., Chem. Abs. 68: 24369g, 1968.
Budnikov et al., Chem. Abs. 70: 60392j, 1969.
Garalevicius et al., Chem. Abs. 75: 15258d, 1971.

Primary Examiner—Donald E. Czaja
Assistant Examiner—James R. Hall
Attorney, Agent, or Firm—Eyre, Mann, Lucas & Just

[57] ABSTRACT

A method of producing an improved mineral board and the resulting product are disclosed. According to the present invention, the board is predominantly composed of perlite and a binder therefor, preferably urea-formaldehyde resin. The perlite is crushed after the composition is in its final shape but before the binder is set whereby its strength is substantially increased. The composition and process of making the board substantially reduce energy costs as compared to known methods for making wet-process mineral boards. The product composition may include up to 95% perlite by weight.

33 Claims, 4 Drawing Figures

METHOD OF MANUFACTURING IMPROVED MINERAL BOARD

This is a continuation of application Ser. No. 967,217, filed Dec. 7, 1978, now abandoned.

The present invention relates to a mineral board product and a method for producing the same. More particularly, the present invention relates to a board product comprising a resin binder and up to 95% perlite material by weight. The board may comprise up to 25% by weight of other ingredients such as mineral fibers, newsprint, gypsum, glass fibers and the like.

In known processes for forming wet-process mineral board products, a considerable amount of water is used in the preparation of the wet mat. The water is necessary for good mat formation and is also necessary in the hydration and application of the starch binder. Formation of the wet mat is known in the art, and Fourdrinier type processes and apparatus are commonly employed. Those processes in which a wet mat or slurry is formed require a considerable amount of energy for dewatering and drying. Typically, a mineral board product made using a Fourdrinier wet process involves the formation of a slurry in which the dispersed solid ingredients usually constitute less than 5% by weight of the slurry. While a substantial portion of the water in the slurry is removed by drainage when the wet mat is formed, the wet mat usually has a water content of at least about 60% when it enters the drier and considerable energy is required to dry the binder-containing wet mat as well as the energy already used in draining and dewatering the slurry.

In addition to the foregoing, conventional mineral board products usually comprise a substantial portion of comparatively expensive fibrous products such as mineral fibers, glass fibers, or the like together with newsprint in order to hold the mineral board together. It is generally considered that in normal mineral board processes no more than about 50% of a filler such as perlite should be employed. Mineral board products of up to 75% perlite have been made but amounts greater than 50% perlite tend to result in substantial reduction in properties such as strength and noise reduction coefficient and also tend to increase dusting problems in the finished board.

In accordance with the present invention, there is disclosed a mineral product, suitably a board product, which represents a substantial improvement over the wet process mineral board products as set forth above. The mineral product of the present invention comprises at least 75% by weight of a combination of perlite and a resin binder therefor. While not at all necessary, up to 25% by weight of other products such as mineral fibers, glass fibers, newsprint or the like may be added if desired. The addition of these materials can in certain instances impart to the finished product improved properties. The perlite in the mineral board product is crushed when the product is put into its final form but before the binder is set whereby there is a substantial increase in the strength of the finished product.

As to the perlite/resin binder portion of the mineral product of the present invention, the perlite is present in the amount of from 50% to 95% by weight of the total composition of the board and the resin binder is present in the amount of from about 5% to 50% by weight of the total composition of the board. In a preferred embodiment of the present invention, the perlite/resin binder combination makes up 95% of the board. In the most preferred embodiment, the perlite/resin binder combination makes up substantially all of the board (i.e., no more than nominal amounts of other ingredients are present).

We will discuss first the perlite material. As is well known, the term "perlite" as used in board products is the lightweight aggregate formed by heating raw perlite material which is a naturally occurring, siliceous, volcanic glass having bound water which when heated to high temperature results in substantial expansion of the particle on an order of magnitude of 4 to 20 times its original volume. As is also well known, raw perlite is generally classified into two different types, one of which is commonly referred to as "lively" or "active" and the other of which is known as "dead" or "inactive". There are distinguished on the basis of softening point, water content, expandability and the like and the differences, if not the exact terms, are well known and accepted throughout the industry. The expanded perlite which is normally used in mineral board product usually has an average bulk density of less than about 10 PCF (pounds per cubic foot). This is sometimes referred to herein as the initial average bulk density of the perlite. Active perlites, when expanded, will generally have a density of from about 2 PCF to about 4 PCF. Expanded inactive perlites will generally have a density of from about 5 PCF to about 10 PCF. As well recognized in the art, however, the difference between active and inactive materials involves far more than simply density. For example, an inactive perlite expanded to 5 PCF will have a much tougher wall structure than an active perlite expanded to 4 PCF and the difference will be much greater than the difference between the wall structure of a 4 PCF material as compared to the wall structure of a 3 PCF material where both are expanded from an active perlite.

It is anticipated that at some future date synthetic perlite or other similar materials may become available and this invention is equally applicable to such materials as may become available which have the same properties as perlite.

With respect to the binder of the present invention, it may be any resin binder which is effective in transferring stress from perlite particle to perlite particle so that applied loads may be evenly distributed, but without the ready propagation of cracks which would occur in a homogeneous, brittle solid (cf. the definition of resin matrix on page 40 of *Fibre Reinforced Materials Technology*, Van Nostrand Reinhold, New York, 1972). Typical of the resin binders that may be used are: thermoplastic resins such as latexes, polyvinyl acetate, and acrylic resins; and thermosetting resins such as urea-formaldehydes, epoxies, melamines, phenolics, and polyesters. Of the foregoing, by far the preferred resin is urea-formaldehyde. The reason for this is that the urea-formaldehyde binders have been found to yield an excellent product even with a very high perlite content. The board products formed with urea-formaldehyde have excellent structural properties, noise absorption characteristics, good water resistance, excellent fire rating and acceptable dusting properties. Urea-formaldehyde resins are especially desirable because they are relatively easy to disperse, are quite inexpensive, are toxicologically safe, are not substantially adversely affected by moisture normally encountered in use, and have excellent fire resistant properties. Where the binder system is a urea-formaldehyde resin, it is to be understood that the inclusion of other products which can act as binders, e.g., starch, phenolics, epoxies or the like, may also be included so long as the minimum amount of perlite/resin binder is maintained.

Where urea-formaldehyde resin is used as the binder, it is preferred that a catalyst be included in the board composition. The applicants have found ammonium dihydrogen phosphate in the amount of 0.01 to 1% to be suitable and up to about 1% phosphoric acid may be used with the ammonium dihydrogen phosphate. In a preferred embodiment of the present invention, the catalyst system comprises 0.01 to 0.6% ammonium dihydrogen phosphate and up to 0.1% phosphoric acid. Best results have been achieved with a catalyst system consisting of about 0.4% by weight ammonium dihydrogen phosphate together with about 0.04% by weight phosphoric acid.

In addition to the catalyst system, there is also advantageously employed in a perlite/urea-formaldehyde mineral board of the present invention a silane coupling agent. It has been found that the inclusion of from about 0.01% to about 0.1% and preferably from about 0.02% to about 0.04% by weight of a silane coupling agent gives considerably better physical properties especially in terms of board strength and water resistance. In fact, the inclusion of silane coupling agents has even permitted use of boards according to the present invention in exterior applications whereas mineral boards commonly used in ceiling systems and made according to conventional processes are generally only considered to be suitable for interior application and even in interior application use is generally limited to areas of relatively low humidity. A preferred silane coupling agent according to the present invention is Dow Corning's Z-6020 which is an amino silane.

As stated previously, the amount of resin binder may be from about 5% to about 50% by weight of the perlite/resin binder content. More particularly, where the expanded perlite has been prepared from an active perlite, the amount of binder may be from about 5 to about 50% while with an expanded perlite prepared from an inactive perlite the amount of binder may be from about 5 to about 40%. In either case the preferred minimum is at least about 10% binder and the preferred maximum, even with expanded perlite material prepared from an active perlite is about 40% and best results are achieved with a binder content of from about 15% to about 35%.

Turning again to urea-formaldehyde as the resin binder, where a ceiling panel or tile is being produced a preferred range of binder is from about 10% to about 20% no matter which type of expanded perlite is used. This quantity balances cost against physical properties. While better physical properties in terms of MOR are generally obtained with higher urea-formaldehyde contents (with an apparently optimum value of about 35%, see FIG. 1) the cost for such a high MOR product is generally not justified for ceiling applications. Most preferred for ceiling applications is a urea-formaldehyde binder content of about 15% to 20% from a cost/strength viewpoint.

It is generally considered undesirable in the art to perform anything other than a gentle mixing of expanded perlite with binder for a short period of time because the expanded perlite is quite fragile and tends to break down if it is mixed for too long a period of time. In general, perlite is mixed for no more than about three minutes with quite gentle mixing action.

In accordance with the present invention, it has been found that breaking down the perlite at a particular time in the process can actually result in a mineral board product with improved properties especially in terms of strength. In order to obtain improved properties by breaking down the perlite, the applicants have found that it is absolutely necessary to break down the perlite when the product is put into its final shape and before the binder has set. It will be appreciated that the term "when the product is put into its final shape" means that the crushing of the perlite produces the final shaped article. For example, where a board product is produced, the mixed perlite and binder are suitably cast onto a forming belt as a sheet. It is at this point in the shape of a board product (the intended product) but its thickness will, of necessity, be reduced when the board product is subjected to pressure to crush the perlite and, upon completion of the crushing, it will be in its final shape. Similarly where the final shape is to be a molded sheel shaped like a serving dish, according to the term as used in the present invention, the product is "put into its final shape" in the mold after its thickness has been reduced by the crushing in the mold to break down the perlite.

This distinction is made because it is absolutely essential that the crushing take place to put the product into its final shape. Crushing the perlite before dry mixing or in furnish mixing is considered undesirable in the art since the advantage of the expanded perlite as a filler is largely lost. Further, it will frequently be of no benefit whatsoever, while in some instances such precrushing is not nearly so advantageous as crushing to put the product into its final shape. Furthermore, even where the perlite has been crushed during an earlier step such as during the dry mixing, the process of the present invention still results in a substantially improved product in terms of strength.

It is also necessary that the perlite be crushed before the binder is set. Since the binder resin employed in accordance with the preferred embodiment of the present invention is a thermoset resin and specifically a urea-formaldehyde resin, it is necessary that the perlite be crushed before the binder cures to completion. The same holds true with other binders also. However, it will be appreciated that with a thermoplastic binder such as a polyvinyl acetate which can be reactivated by heat it is possible to "set" the binder without crushing the perlite, heat the product to reactivate the binder and then crush the perlite whereafter the binder can be set again. Such a process could be advantageous where it is desirable to make a large number of preforms to final shape in one operation and subsequently reactivate the binder and crush the preforms.

In accordance with the present invention, the bulk volume of the perlite is decreased during the crushing step by a factor which varies according to the type of perlite and the amount of resin in the product. The purpose of the crushing of the perlite is to increase the physical properties of the finished product and in particular the modulus of rupture (MOR). It has been found that where the percentage of binder is lower it requires a higher degree of crushing to achieve an acceptable increase in MOR.

The applicants have found that the approximate minimum crushing factor may be determined from the following three formulae:

$$y = 6.5 - 0.26x \qquad (1)$$

$$y = 3.1 - 0.035x \quad (2)$$

$$y = 2.3 - 0.03x \quad (3)$$

wherein: x is percent binder by weight of perlite/binder combination and y is the crusing factor.

In all three cases, the values for y are rounded to the nearest tenth to find the approximate minimum crushing factor.

Formula (1) is used where the expanded perlite has been prepared from an active perlite and the percent binder is from about 5 to about 15.

Formula (2) is used where the expanded perlite has been prepared from an active perlite and the percent binder is from about 15 to about 50.

Formula (3) is used where the expanded perlite has been prepared from an inactive perlite and applies where the percent of binder is from about 5 to about 40.

In each case, the initial average bulk density of the perlite is rounded off to the nearest whole number to determine the correct formula to use.

From the foregoing it may be seen that the formulas may be restated as follows: where an expanded perlite has been prepared from an active perlite:

(1) $y = 6.5 - 0.26x$ where x is from about 5 to about 15
(2) $y = 3.1 - 0.035x$ where x is from about 15 to aout 50 where an expanded perlite has been prepared from an inactive perlite:
(3) $y = 2.3 - 0.03x$ where x is from about 5 to about 40 and in each of formulas (1), (2) and (3) y is the crushing factor and x is the percent by weight of binder in the perlite/binder combination.

It is thus seen that where the binder is 20% by weight of a perlite/binder combination with the perlite being expanded from an inactive perlite a minimum crushing factor of about 1.7 is required, while where the binder is 10% by weight of the perlite/binder combination with a perlite expanded from an active perlite a crushing factor of at least about 4 is required. While the preceding are the minimum values for crushing, substantial advantage is obtained when even higher crushing values are utilized (see examples infra). In accordance with the preferred embodiment of the present invention, the crushing factor is at least 3 for expanded perlites prepared from active perlite regardless of binder percentage and at least 2.5 for expanded perlites prepared from inactive perlites. It is even more preferred that a minimum crushing factor of at least 4 be utilized regardless of perlite type or binder percentage. Crushing factors between 5 and 10 have been found to give excellent results.

These and other aspects of the present invention may be more fully understood with reference to the annexed drawings wherein.

Figure 2:
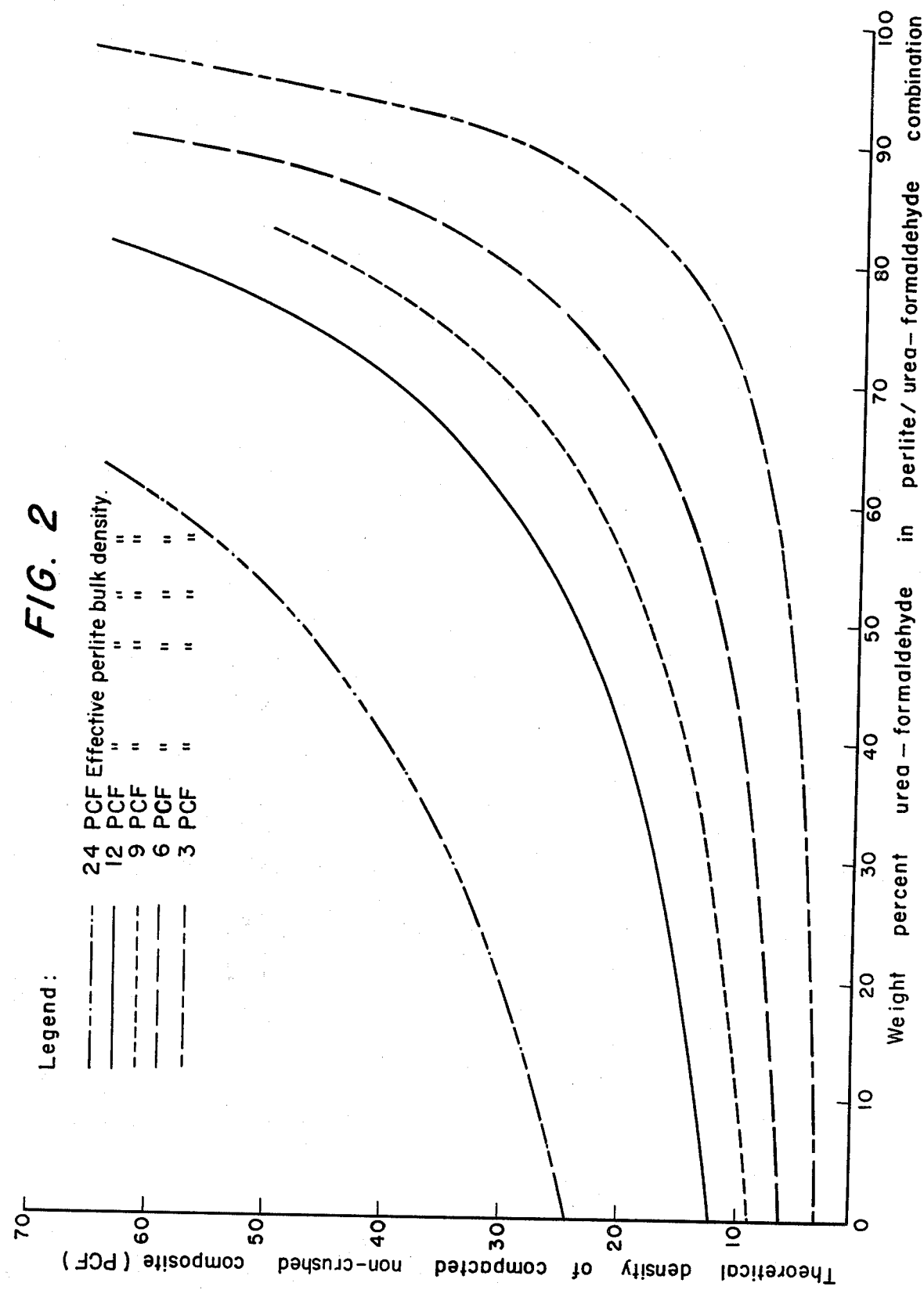
FIG. 2 shows the theoretical densities of compacted, non-crushed perlite/urea-formaldehyde combinations.

The crushing factor of the perlite is determined by the measured density of the final product as compared to its theoretical density. This results in an indication of reduction in bulk volume of the perlite and thus indicates the crushing factor. Referring to FIG. 2 of the drawings, there is shown one method of determining the crushing factor.

In FIG. 2 there has been plotted the theoretical density of the perlite/binder combination against percentage by weight of binder. The theoretical density has been computed by the so-called rule of mixtures. Under the rule of mixtures, all components are compacted to the greatest degree possible to eliminate spaces between adjacent components but without compressing or crushing of any of the components. In this particular instance, a urea-formaldehyde binder was employed. It will be appreciated that anyone of ordinary skill in the art can add curves for other perlite densities and can make up separate graphs for other binders.

Looking at a composite comprising 40% urea-formaldehyde and 60% of a perlite material having an initial average bulk density of 6 PCF, the theoretical density would be 10 PCF (read from the line starting at 6 PCF where binder level is at 0). Presume a product is made from 40% urea-formaldehyde and 60% 6 PCF perlite and is crushed in accordance with the present invention. Presume further that the bulk density of the final product after crushing and curing the binder is 40 PCF. Since urea-formaldehyde resin does not compact or compress to a noticeable degree, it can be seen from the graph that the apparent density of the perlite is 24 PCF (again read at 0% binder from the curve which has coordinates at 40% urea-formaldehyde and 40 PCF density of the composite). A 6 PCF perlite having an apparent density of 24 PCF has been crushed by a factor of 4.

The degree of difficulty of crushing a particular expanded perlite is dependent upon the type of perlite from which it was prepared and its initial average bulk density. In general, the expanded perlites prepared from the active perlites are considerably easier to crush than those prepared from inactive perlites. Furthermore, and still speaking in general terms, as the initial average bulk density goes up, so does the pressure required for a corresponding reduction in bulk volume of the perlite. While a reduction in bulk volume can be accomplished with expanded perlite prepared from an inactive perlite, it is preferred that the expanded perlite be of the active type and have an initial average bulk density before crushing of from about 2 to about 4 PCF, most preferably about 3 PCF since such a perlite will crush much more readily but yet will generally yield perlite board structure every bit as good as, if not better than, that achieved with higher initial average bulk density perlite. With a 3 PCF perlite material, it is possible to achieve a fivefold reduction in the bulk volume of the perlite in a perlite/urea-formaldehyde mixture with a pressure as low as 60 p.s.i.

Figure 3:
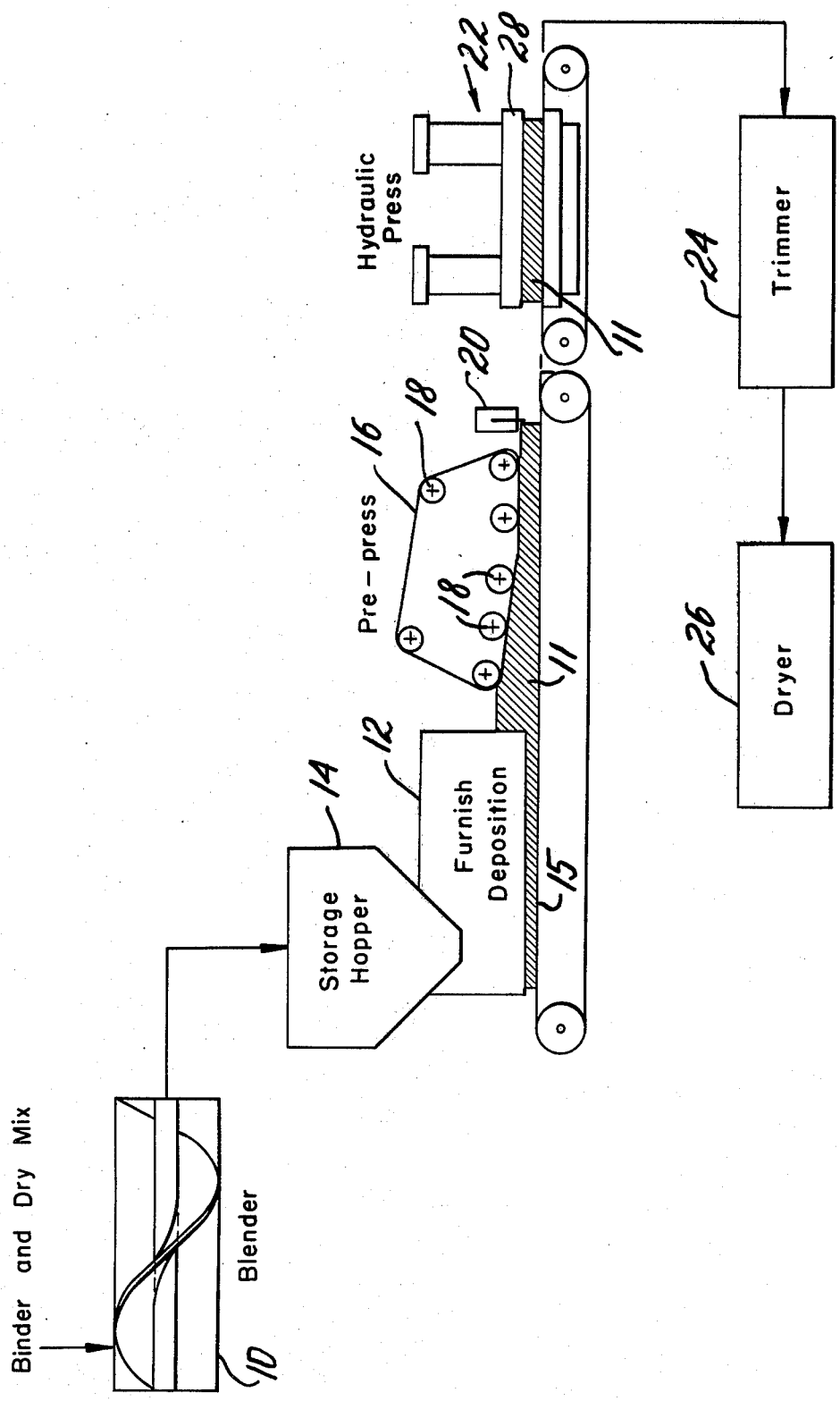
FIG. 3 shows an apparatus suitable for carrying out the present invention.

In forming the board of the present invention and referring to FIG. 3, the dry ingredients are first admixed (not shown). The dry ingredients are the perlite together with other materials used such as mineral fibers, glass fibers, newsprint, gypsum, silica and the like. Thereafter, the binder is dispersed in the dry mix, suitably in a blender 10. It is usually desirable to employ a carrier such as water for dispersing the binder in the dry mix. It is pointed out that the quantity of water employed may be relatively small compared to the water employed in the usual wet board process. More particularly, the amount of water used may be as low as 20% by weight of the total composition or even lower. Such a small quantity of water requires substantially less energy for drying than is required with wet mat processes which, even though a substantial portion of the water has been removed by free drainage, suction and pressing, typically still have 60% or more by weight water when entering the drier oven.

Figure 4:
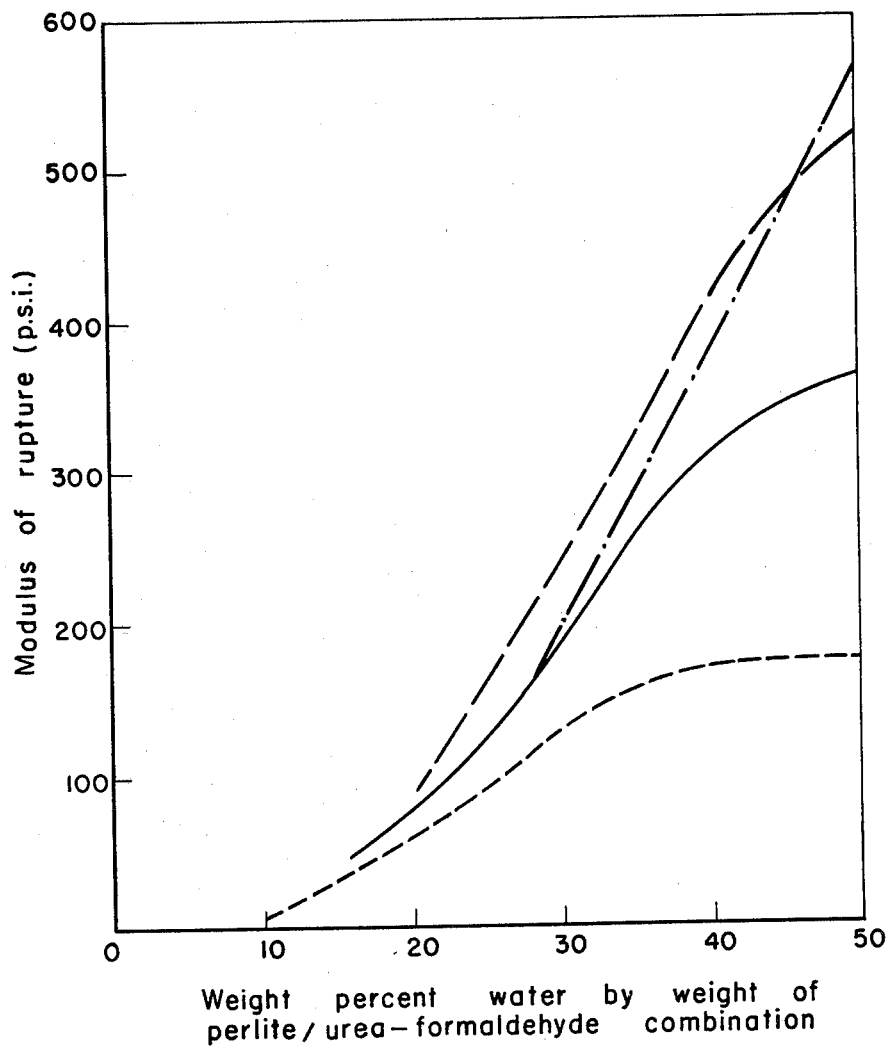
FIG. 4 shows the errect of increasing water content on strength.

It has been found, however, that, to a point, greater quantities of water can result in higher strength values with certain water dispersible binders such as urea-formaldehyde. This is demonstrated in the graph of FIG. 4 which plots MOR vs. weight percent water for compositions of varying ratios of 3 PCF perlite to urea-formaldehyde binder and at constant final density (16 PCF). As there shown, a composition 10% in urea-formaldehyde and 90% in perlite (weight percent of the perlite/resin binder content) has considerably greater MOR at 35% water than at 25% water. However, increasing the water content above 35% does not increase strength. In fact, it could actually be detrimental since it could cause delamination of the formed board during drying and curing due to too much steam pressure. It can also be seen that the board with 20% urea-formaldehyde exhibits greater strength until the water content is approximately 50% after which little further advantage is obtained. With the higher urea-formaldehyde percentages (35% and 50%), strength is still increasing at the 50% water level.

While higher strengths can be achieved with higher water levels, there must be a balancing between energy considerations and strength considerations and there must also be taken into account possible delamination during drying and curing. Taking all of this into account, we prefer to use a water content of about 20% to 40%, no matter what the percentage of urea-formaldehyde, and we most prefer a water content of about 25-35%.

After the furnish composition comprising the perlite and binder resin is prepared, it is formed to final shape and then the binder is set. In the situation where a flat sheet is prepared, it is suitable to cast the furnish composition 11 from a furnish deposition chamber 12 fed by a storage hopper 14 onto a continuous belt 15 then precompress it with an endless belt 16, suitably a screen which travels on rollers 18. The board is then cut by cut off means 20. The dimension is such that it will fit in the platen press 22. The cut sheet is then crushed in the platen press to yield a product of a thickness of from about ⅛ inch to 2 inches, preferably about 3/16 inch to ¾ inch. The finished material will usually have a density of from about 8 to about 80 PCF, preferably from about 10 to about 50 PCF and most preferably from about 15 to about 45 PCF. The board may then be trimmed in trimmer 24, if desired. Whether or not trimmed, the board is then cured, suitably in a single deck belted drier 26 as shown. It will be understood that the drier may be dispensed with, depending upon the particular binder employed.

While the flat sheet form is the preferred embodiment of the present invention, it must also be understood that the furnish may be used to make molded forms other than flat sheets. There are a number of different ways in which molded products may be made according to the present invention. For example, the composition may be placed in the bottom half of a mold, the top may then be put on and compressed to crush the perlite and reduce its bulk volume and then the binder may be cured with the molded product still in the mold. Alternatively, the crushed molded product may be removed from the mold, (after partial curing in the mold if necessary) placed over a support and then the binder may be cured. In still another method, the crushed molded product may be removed from the mold, placed on a screen without a support and then the binder may be cured. It will be understood that the particular process employed will depend to a great degree on the consistency of the molding composition, the shape of the molded product, the residence time in the mold and other similar factors.

It is pointed out that molding can also be used where a sheet product is formed. For example, where a board product is being produced with so-called "reveal" edges and the board product is being formed in a platen press, the top of the press can have a mold which is a negative of the finished board product and can form the finished reveal edge during the crushing of the perlite. This eliminates the need for a separate routing step such as in trimmer 24 to form the reveal edge. In addition, since a reveal edge is thinner than the rest of the board, the compaction necessary to achieve the thinner edge will be higher than that for the board as a whole, and this will result in greater crushing of the perlite at the edge with a corresponding increase in strength. This is highly advantageous since the greatest strength is acquired on the edge, exactly where it is needed.

Molded products may, of course, have any desired thickness. However, the degree of crushing of the perlite necessary for the present invention is equally applicable to molded and sheet products and, therefore, molded products will generally have the same density as sheet products.

Another aspect of molding is that surface patterns may be embossed during the crushing step with either sheet products or molded products. A negative of the pattern is made on the top of the mold or top plate 28 of the platen press 22 and the design is impressed during compression. It has been found that there will be excellent rendition of the pattern even if there is only a very short residence time of pressure. More particularly, it has been found that products according to the present invention exhibit very little springback as a result of which it is not necessary to maintain the product under pressure throughout the curing cycle. In fact, with sheet products it has been found that a residence time under pressure of less than one second is sufficient to obtain good surface rendition.

Whether a board or molded product is made, it is, of course, necessary to cure the binder after the perlite has been crushed. The method of curing will depend upon the particular binder employed. While some binders will require heat, others can be cured at room temperature. Where the binder is a urea-formaldehyde resin, it is preferably set by heating, suitably at a temperature of from about 340° F. to about 400° F. (about 170° C. to 205° C.) for a period of from about 30 to about 40 minutes. It will be appreciated that these temperatures and times are not at all critical and that it is only necessary to use sufficient temperature and time to dry the board product and cure the binder to the point where the board has sufficient structural integrity to be self-supporting. It will be appreciated that the degree of dryness and the degree of cure will have different effects on the structural integrity of the board. It has been found that where urea-formaldehyde is used as the binder, a reduction in water content to below 10% and a cure of at least ⅔ theoretical gives the board sufficient structural integrity to be self-supporting. In the preferred process according to the present invention, the moisture content is reduced below 5% and the urea-formaldehyde binder is substantially completely cured at the temperatures as given above.

The mineral board products made with urea-formaldehyde resin have been found to be readily and cleanly machined, sawed or routed. Additionally, the products have been found to have an acceptable fire rating, good water resistance, noise absorption characteristics, excellent dimensional stability even under high humidity conditions, natural bactericidal activity, and good impact and cohesive strength.

With specific respect to noise absorption characteristics, it has been found that urea-formaldehyde products according to the present invention will usually have an estimated noise reduction coefficient (ENRC) of at least 20 and will frequently be over 30. ENRC's as high as 50 have been obtained and it is believed that even higher ENRC's are obtainable. It is known in the mineral board industry that ENRC's vary considerably depending upon such factors as process conditions, finish applied to the product, whether or not the board is supplied with acoustical openings and the like and it has been found that the same factors affect the ENRC of products according to the present invention.

With respect to the strength of the product, this is generally gauged in the industry according to the modulus of rupture (MOR) of the board. The MOR of boards according to the present invention is quite good. Where a urea-formaldehyde resin is used, the MOR remains good even under high humidity conditions and even following total immersion in water. Strength can be increased by adhering a lamina to either or both surfaces of the finished product. Typical lamina useful for this function are paper, textile material, metal foil, woven fiberglass mats, high and low pressure laminates, and the like.

A number of Examples were conducted in order to demonstrate the various features of the present invention. Except as otherwise specified, the Examples are the same in the following respects. The dry ingredients including the perlite and other materials such as newsprint, glass fibers, mica, etc. were dry blended whereafter an aqueous solution of a urea-formaldehyde resin together with a catalyst was added to and mixed with the dry blend. The perlite had a nominal initial average bulk density of about 3 PCF and was prepared from an active perlite. Where perlite initial average bulk densities of 5 and 7 are indicated, the expanded perlite was prepared from an inactive perlite. The amount of water used was about 35 ml. per 100 grams of solid material and the catalyst was 0.04% phosphoric acid and 0.4% ammonium dihydrogen phosphate. The particular urea-formaldehyde resin used had a formaldehyde to urea ratio of 1.2. This material is available from Reichold Chemicals under the trademarks Foramine 21-082 and Foramine 21-042, two very similar products. The blend was then formed to the shape of a board, crushed to reduce the bulk volume of the perlite by a factor of at least three times and dried and cured at a temperature of about 360° F. to 380° F. for about 35 minutes. The resulting boards had a thickness of approximately ½ inch and were tested for various properties. The density of the board is measured in pounds per cubic foot (PCF). The modulus of rupture (MOR) of the board is measured in terms of pounds per square inch (p.s.i.). Both of these tests are very well known in the art. Hardness, where measured, was by a special test which determines the difference in penetration into the board of a 2 inch diameter steel sphere impressed in a first instance at a pressure of 15 p.s.i. for 10 seconds and in a second instance at 60 p.s.i. for 15 seconds.

EXAMPLE 1

A conventional mineral fiberboard obtained from Conwed Corporation of St. Paul, Minn. was tested for various properties. The board had a density of 17 PCF, an MOR of 209 p.s.i. and a hardness of 0.09 inches. The board had been formed by the wet process on a Fourdrinier machine from an aqueous slurry with less than 5% solids content. The solids content of the slurry was about 55% mineral fibers, 15% starch binder, 15% secondary fibers and 15% perlite having an initial average bulk density of about 8 PCF.

EXAMPLE 2

The board was formed in accordance with the present invention having a solids content by weight of 70% perlite, 15% cellulosic fiber (newsprint), and 15% urea-formaldehyde resin. The finished (i.e., cured) board was tested and found to have a density of 17.2 PCF, an MOR of 202 p.s.i. and a hardness of 0.03 inches.

EXAMPLE 3

In this instance the board composition was 75% perlite, 10% cellulosic fiber and 15% urea-formaldehyde resin. The cured board had a density of 17.4 PCF, an MOR of 259 p.s.i. and a hardness of 0.03 inches.

EXAMPLE 4

The cellulosic fiber content was again reduced so that in this instance the composition was 80% perlite, 5% cellulosic fiber and 15% urea-formaldehyde resin. The density of the finished board product was 17.4 PCF, the MOR was found to be 270 p.s.i. and the hardness 0.03 inches.

EXAMPLE 5

In this case the cellulosic fiber was completely eliminated and the composition was 85% perlite and 15% urea-formaldehyde resin. The density of the finished board product was found to be 16.8 PCF, the MOR was found to be 279 p.s.i. and the hardness 0.02 inches. This board was also tested according to Underwriters Laboratory UL-94 Vertical Position Flame Test and was found to qualify for the SE-0 rating.

COMMENT

As can be seen from the foregoing Examples, the addition of cellulosic fiber such as newsprint has no advantageous effect on the properties of products according to the present invention and, in fact, the lesser amounts of newsprint result in products with the highest MOR values.

EXAMPLE 6

The composition in this Example was composed of 65% perlite, 15% urea-formaldehyde resin and 20% glass fibers having an average length of about ¼ inch. These glass fibers are typically used in reinforcement of plastic materials. The finished board product was found to have a density of 17 PCF and an MOR of 217 p.s.i.

EXAMPLE 7

Example 6 was repeated except that mica was used in place of the glass fibers and there was also added 0.04% of a silane coupling agent (Z-6020). The finished board product had a density of 16.9 PCF and an MOR of 190 p.s.i.

COMMENT

Examples 6 and 7 when compared to Example 5 demonstrate that commonly used reinforcing fillers do not show an increase in MOR on products of the present invention even when they are used at relatively high levels.

EXAMPLE 8

The composition of the board was 85% perlite, 10% cellulosic fiber and 5% urea-formaldehyde resin. The finished board had a density of 17.3 PCF and an MOR of 71 p.s.i.

EXAMPLE 9

In this case the composition of the board was 70% perlite, 10% cellulosic fiber and 20% urea-formaldehyde resin. The finished board had a density of 17.5 PCF and an MOR of 303 p.s.i.

EXAMPLE 10

The composition of the board was 91% perlite and 9% urea-formaldehyde resin. The finished board had a density of 15.6 PCF and an MOR of 140 p.s.i.

EXAMPLE 11

Example 10 was repeated except that the amount of urea-formaldehyde resin was doubled so that the board composition was 18% urea-formaldehyde resin and 82% perlite. The finished board had a density of 16.0 PCF and an MOR of 275 p.s.i.

EXAMPLE 12

Example 10 was repeated except that in this case the amount of urea-formaldehyde resin was approximately quadrupled in that the board composition was 35% urea-formaldehyde and 65% perlite. The finished board product was found to have a density of 15.8 PCF and an MOR of 315 p.s.i.

EXAMPLE 13

Example 10 was repeated except that in this case the amount of urea-formaldehyde resin was raised to 50% with the other 50% being perlite. The finished board product was found to have a density of 16 PCF and an MOR of 280 p.s.i.

COMMENT

Figure 1:
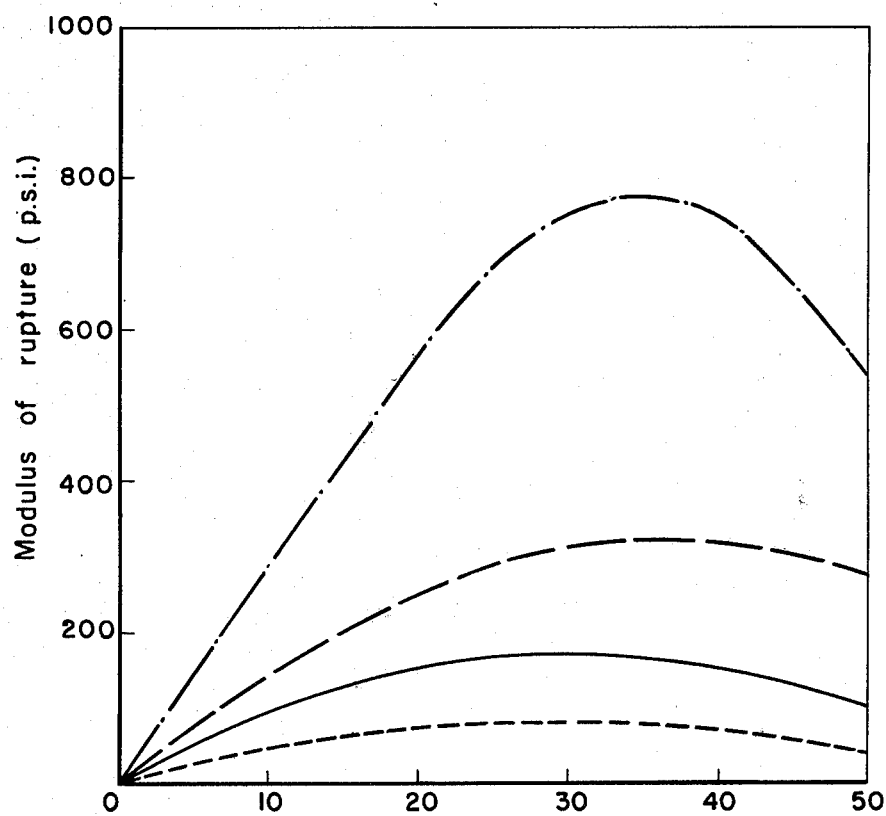
FIG. 1 shows the effect of increasing binder percentage on strength.

Examples 8-13 demonstrate that MOR values are greatly affected by the amount of urea-formaldehyde resin in the system. While resin amounts as low as 5% urea-formaldehyde resin can be employed, MOR values are increased considerably as urea-formaldehyde percentages increase. However, as urea-formaldehyde percentage exceeds 35%, the MOR value starts to drop off (see FIG. 1). Thus, 35% urea-formaldehyde appears to be an optimum value for strength, at least in the case of a board having 35% water in the starting composition and a density of 16 PCF in the finished composition. Note also in this group of Examples the difference in MOR between Examples 9 and 11 despite the quantity of urea-formaldehyde being the same. This difference is attributed to the greater degree of crushing in Example 9 as indicated by the higher density value.

EXAMPLE 14

The board is made from a composition which is 70% perlite, 15% cellulosic fiber and 15% urea-formaldehyde resin. In this Example, the urea-formaldehyde is Parez 615 rather than a Foramine. Parez 615 is a cationic urea-formaldehyde available from American Cyanamid. The finished board product was found to have a density of 16.6 PCF and an MOR of 144 p.s.i.

EXAMPLE 15

Example 14 was repeated except that in place of the Parez 615 there was employed a urea-formaldehyde resin made by the applicants. The urea-formaldehyde resin was formed in standard manner and had a formaldehyde to urea ratio of 2.0. In this case the finished board product had a density of 16.6 PCF and an MOR of 204 p.s.i.

COMMENT

Examples 14-15 demonstrate that various urea-formaldehyde resins may be used in forming the products of the present invention.

EXAMPLE 16

Example 5 was repeated except that in addition to the 85% perlite and the 15% urea-formaldehyde resin there was also included in the composition of the board 0.02% by weight of a silane coupling agent, specifically Z-6020. The finished board was found to have a density of 16 PCF and an MOR of 270 p.s.i. This board and the boards of Examples 1 and 5 were immersed in water for a period of 24 hours and were then again tested for MOR. The board of Example 1 had an MOR of only 9 p.s.i., the board of Example 5 had an MOR of 101 p.s.i. whereas the board of the instant Example had an MOR of 258 p.s.i.

COMMENT

The test of Example 16 demonstrates that the board product of the present invention has good water resistance and that the addition of a silane coupling agent can substantially increase the water resistance of the board product of the present invention.

EXAMPLE 17

The three boards of Example 16 were also tested for dustiness. The test employed was an in-house test designed to simulate normal handling of boards since dustiness is generally considered to be an undesirable handling characteristic. The amount of dust given off by a particular board is determined by measuring the weight of the board before and after the dustiness test and determining the percent weight loss. The board of Example 1 had a weight loss of 3.5% and the board of Example 5 had a weight loss of 7.4%, whereas the board of Example 16 had a weight loss of only 1.6%.

COMMENT

The test of Example 17 demonstrates that the silane coupling agent is beneficial in reducing the dustiness of products according to the present invention.

EXAMPLE 18

Example 5 was repeated. In this instance the board was crushed in forming sufficiently to reduce the bulk volume of the perlite by a factor of about 9.3. The density of the finished product was found to be 35.3 PCF, the MOR 917 p.s.i. and the hardness 0.0045 inches. The modulus of elasticity of the board product was tested on a standard Riehle Testing Machine and was found to be 230,000 p.s.i.

EXAMPLE 19

Example 18 was repeated except that the board product also included 0.04% Z-6020. In this case, the density of the finished board was 34.5 PCF, the MOR 980 p.s.i., the hardness 0.0030 and the modulus of elasticity 284,000 p.s.i.

COMMENT

Examples 18 and 19 demonstrate that the inclusion of a silane coupling agent will increase the MOR of the finished product in addition to increasing water resistance and reducing dustiness as shown in Examples 16 and 17.

EXAMPLE 20

The board was made from a composition composed of 90% perlite, 10% urea-formaldehyde resin and 0.04% of Z-6020. The bulk volume of the perlite was decreased by a factor of 2.3 by crushing of the board to put it into its final shape. The reduction in bulk volume was computed from the measured density of the finished cured product, 8 PCF, as compared to the theoretical density without crushing of the perlite, 3.5 PCF. The finished board product was found to have an MOR of only 25 p.s.i.

EXAMPLE 21

Example 20 was repeated except that in this case the crushing factor was 3.7 as indicated by a final board density of 12.6 PCF. With the increase in crushing the MOR increased to 75 p.s.i.

EXAMPLE 22

Example 20 was again repeated except that the crushing factor was increased to 5.8. The MOR of the finished board was 350 p.s.i.

EXAMPLE 23

Example 20 was repeated once more with the crushing factor increased to 11. In this case, the MOR of the finished board product was 955 p.s.i.

COMMENT

Examples 20-23 demonstrate that increased crushing of the perlite during formation of the final shape of the product results in a substantial increase in the MOR value of the product. However, there is a minimum threshold above which the crushing factor must go in order to obtain an acceptable MOR for products of the present invention. Without crushing of the perlite during formation of the final shape in accordance with the present invention, board products of perlite and urea-formaldehyde will have an MOR value substantially below that of products according to the present invention. For a perlite/urea-formaldehyde combination which is 10% in urea-formaldehyde and with a perlite expanded from an active perlite, the approximate minimum crushing factor in accordance with the present invention as determined by the crushing factor formula (1) given hereinbefore is 3.9. As can be seen from Example 20, a crushing factor of 2.3 yields a product with an MOR of only 25 while increasing the crushing factor to 3.7 yields a product with an MOR of 75.

EXAMPLE 24

Example 20 was repeated except that the quantity of perlite was reduced to 85% and the quantity of urea-formaldehyde was increased to 15%. In this case there was only enough pressure applied to the board to compact it and there was no more than negligible crushing of the perlite. The compacted board had a density of about 5 PCF which is equivalent to the theoretical density of an uncrushed board, see FIG. 2. The MOR of the cured, compacted, uncrushed board was 30 p.s.i.

EXAMPLE 25

Example 24 was repeated except that the crushing factor was increased to 2.7, as evidenced by the fact that the board had a density of 10.3 PCF. According to the formulas (1) and (2) as given hereinbefore, the approximate minimum crushing factor for this particular composition is 2.6 and thus a crushing factor of 2.7 should give a board with a considerably better MOR than an uncrushed board. In this case the MOR was raised to 100 p.s.i.

EXAMPLE 26

Example 24 was repeated except that the crushing factor was increased to about 4. The MOR of the resulting board was 245 p.s.i.

EXAMPLE 27

Example 24 was repeated a further time with the crushing factor increased to 8.2. In this instance the MOR was raised to 720 p.s.i.

EXAMPLE 28

Example 24 was repeated once again but with a crushing factor of 11.2. In this instance the MOR of the finished board was 1,450 p.s.i.

COMMENT

Examples 24-28 are similar to Examples 20-23 in that they again show that an increase in the crushing factor results in an increase in the strength of the board as exemplified by the MOR of the board. Of special interest is Example 24 showing that without crushing of the perlite there is obtained only a very low MOR value.

EXAMPLE 29

Example 20 was repeated except that in this case the perlite was decreased to 80% and the urea-formaldehyde was increased to 20%. This composition was tried with a number of different crushing factors with the results as follows:

| Density | Crushing Factor | MOR |
| --- | --- | --- |
| 8 | 2* | 20 |
| 10 | 2.5 | 60 |
| 16 | 4 | 210 |
| 39.2 | 9.8 | 1,350 |

EXAMPLE 30

Example 30 was repeated again except that in this case the perlite level was decreased to 65% and the urea-formaldehyde level was increased to 35%. Tests were again made at various crushing factors with the results as follows:

| Density | Crushing Factor | MOR |
|---------|-----------------|-------|
| 7       | 1.5*            | 20    |
| 10.1    | 2.1             | 60    |
| 15.8    | 3.3             | 300   |
| 32.6    | 6.8             | 1,733 |

EXAMPLE 31

Example 20 was repeated once more but in this case the perlite and urea-formaldehyde were each at 50%. The results of crushing at various factors was as follows:

| Density | Crushing Factor | MOR   |
|---------|-----------------|-------|
| 7.5     | 1.3*            | 20    |
| 10      | 1.7             | 60    |
| 13.5    | 2.3             | 140   |
| 27      | 4.5             | 750   |
| 38.2    | 6.4             | 1,450 |

COMMENT

Examples 29-31 in conjunction with Examples 20-28 demonstrate that an increase in MOR value is obtained with increased crushing at all urea-formaldehyde values within the present invention. The asterisked crushing factors are those which are below the minimum acceptable crushing factor in accordance with the formulas of the present invention as given hereinbefore.

These Examples also demonstrate that higher urea-formaldehyde level compositions require less crushing in order to achieve the minimum desired MOR. In Example 20 a crushing factor of 2.3 yielded an MOR of only 25 while in Example 31, the identical crushing factor resulted in an MOR of 140. The difference is, of course, in the percentage of urea-formaldehyde between the two Examples.

EXAMPLE 32

In this Example 85% perlite was used together with 15% of an acrylic resin binder. More particularly, the binder was a water soluble acrylic resin solution containing about 30% solids sold under the trademark Carboset 531 available from B. F. Goodrich. When the board was crushed into its final form, the perlite was crushed by a factor of 4 yielding a product with a density of 15.9 PCF and an MOR of 114 p.s.i.

EXAMPLE 33

Example 32 was repeated except that in this case an epoxy resin was used in place of the acrylic resin. The epoxy resin was specifically Epon 828 available from Shell Chemical Company. The resulting board had a density of 18.7 PCF and an MOR of 274 p.s.i.

COMMENT

Examples 32 and 33 illustrate that binders other than urea-formaldehyde can be employed in accordance with the present invention. The Carboset 531 binder is a thermoplastic material while the Epon 828 binder is a thermoset material.

EXAMPLE 34

The board was made from a composition composed of 85% perlite and 15% urea-formaldehyde resin together with 0.04% of Z6020. In this instance the perlite was expanded from an inactive perlite and the expanded perlite had an initial average bulk density of about 5 PCF. This composition was tried with a number of different crushing factors with the results as follows:

| Density | Crushing Factor | MOR |
|---------|-----------------|-----|
| 14.6    | 2.3             | 240 |
| 20      | 3.2             | 322 |
| 26      | 4.1             | 613 |

EXAMPLE 35

Example 34 was repeated except that in this instance the perlite was decreased to 65% and the urea-formaldehyde was increased to 35%. Again, a number of different crushing factors were tried with the results being as follows:

| Density | Crushing Factor | MOR   |
|---------|-----------------|-------|
| 14.6    | 1.8             | 232   |
| 17.5    | 2.1             | 323   |
| 33.1    | 4.0             | 1,576 |

EXAMPLE 36

Example 34 was repeated again except that in this instance a perlite having an initial average bulk density of about 7 was substituted for the perlite having an initial average bulk density of about 5. This perlite material was also expanded from an inactive perlite. The results of the tests at various crushing factors are as follows:

| Density | Crushing Factor | MOR |
|---------|-----------------|-----|
| 8.6     | 1.1*            | 7   |
| 17.3    | 2.2             | 99  |
| 25.7    | 3.2             | 306 |
| 35.4    | 4.4             | 798 |

EXAMPLE 37

Example 35 was also repeated with a perlite having an initial average bulk density of about 7 substituted for the perlite having an initial average bulk density of about 5. In this case the results of the tests at various crushing factors are as follows:

| Density | Crushing Factor | MOR   |
|---------|-----------------|-------|
| 11.6    | 1.1*            | 68    |
| 21.2    | 2.0             | 332   |
| 29.4    | 2.9             | 1,002 |
| 35.9    | 3.5             | 1,494 |

COMMENT

Examples 34-37 demonstrate that the present invention is applicable to expanded perlites prepared from inactive perlite materials as well as to expanded perlite prepared from active perlite material. The asterisked numbers indicate crushing factors which are below the approximate minimum crushing factor determined by formula (3). As with the expanded perlite formed from active perlite material, the expanded perlite formed from inactive perlite material also exhibits increasing MOR as the crushing factor increases.

EXAMPLE 38

Example 34 was repeated again except that in this instance the perlite material was precrushed before it was combined with the binder. The perlite material was precrushed by a factor of 1.9 times which is equivalent to the approximate minimum crushing factor for expanded inactive perlite at a urea-formaldehyde level of 15% and a perlite level of 85% by weight. The expanded perlite material was precrushed in a platen press. Thereafter, it was mixed with the urea-formaldehyde binder. The formed board was then subjected to a further crushing step to put it into its final form. This is, of course, the crushing step according to the present invention. The results of the tests for the various crushing factors are as follows:

| Density | Crushing Factor | MOR |
|---|---|---|
| 18.3 | 1.7* | 18 |
| 25.9 | 2.3 | 106 |
| 38.1 | 3.5 | 647 |

EXAMPLE 39

Example 38 was repeated except that in this instance the urea-formaldehyde level was increased to 35% and the perlite level was reduced to 65%. The same precrushing factor for the perlite of 1.9 was employed. In this instance the results of the tests at various crushing factors were as follows:

| Density | Crushing Factor | MOR |
|---|---|---|
| 19.2 | 1.4 | 276 |
| 31 | 2.2 | 127 |
| 37.3 | 2.6 | 218 |

EXAMPLE 40

Example 38 was repeated again except that perlite material having an initial average bulk density of about 7 was substituted for the perlite material having an initial average bulk density of about 5. The results of the tests at various crushing factors are as follows:

| Density | Crushing Factor | MOR |
|---|---|---|
| 21.6 | 1.4* | 85 |
| 41.5 | 2.8 | 194 |

EXAMPLE 41

Example 39 was repeated with the perlite material having an initial average bulk density of about 7 substituted for the perlite material having an initial average bulk density of about 5. The results of the tests at various crushing factors were as follows:

| Density | Crushing Factor | Mor |
|---|---|---|
| 31.3 | 1.6 | 734 |
| 33.5 | 1.8 | 994 |

COMMENT

Examples 38–41 show that it is the crushing of the perlite to put the board into its final shape which really gives the increased strength and that simple precrushing of the perlite is not sufficient. As with previous examples, the asterisked crushing factors indicate those which are below the approximate minimum crushing factor according to formula (3). Note that even with precrushing at 1.9 and with a crushing during final formation of 1.7 in Example 38 there was still obtained only a very low MOR.

These examples also demonstrate that the crushing of perlite during final formation of the board is effective to increase the MOR even where the perlite has been precrushed.

It will be understood that the claims are intended to cover all changes and modifications of the preferred embodiments of the invention, herein chosen for the purpose of illustration, which do not constitute departures from the spirit and scope of the invention.

What is claimed is:

1. A method of manufacturing a mineral product comprising the sequential steps of:
   (a) forming an admixture comprising perlite and a resin binder therefor, at least 75% by weight of the solids content of said admixture being composed of the perlite/resin binder combination, the perlite being in the expanded form and having an initial average bulk density no greater than about 10 pounds per cubic foot, the said perlite/resin binder combination containing by weight from about 50% to about 95% perlite and from about 5% to about 50% resin binder where the expanded perlite is derived from an active perlite, and the said perlite/resin binder combination containing by weight from about 60% to about 95% perlite and from about 5% to about 40% resin binder where the expanded perlite is derived from an inactive perlite;
   (b) mixing said admixture;
   (c) forming a shaped product from said admixture;
   (d) subjecting said shaped product to pressure to form it into its final shape, said pressure being sufficient to reduce the bulk volume of the perlite by a crushing factor of at least about;
      (i) where the expanded perlite has been derived from an active perlite:
         (1) $y = 6.5 - 0.26x$ where x is from about 5 to about 15
         (2) $y = 3.1 - 0.035x$ where x is from about 15 to about 50
      (ii) where the expanded perlite has been derived from an inactive perlite:
         (3) $y = 2.3 - 0.03x$ where x is from about 5 to about 40 wherein in each of formulas (1), (2) and (3): y is the crushing factor and x is the percent by weight of binder in the perlite/resin binder combination; and, thereafter,
   (e) curing the resin binder.

2. The method of claim 1 wherein the expanded perlite is derived from an active perlite and the said crushing factor is at least about 3.

3. The method of claim 1 wherein the expanded perlite is derived from an inactive perlite and the said crushing factor is at least about 2.5.

4. The method of claim 1 wherein the said crushing factor is at least about 4.

5. The method of claim 1 wherein the said crushing factor is from about 5 to about 10.

6. The method of claim 1 wherein the perlite has an initial average bulk density of from about 2 to about 4 pounds per cubic foot.

7. The method of claim 6 wherein the perlite has an initial average bulk density of about 3 pounds per cubic foot.

8. The method of claim 1 wherein the resin binder is present in the amount of from about 10% to 40% by weight of the perlite/resin binder combination.

9. The method of claim 1 wherein the perlite/resin binder combination makes up about 95% by weight of the solid contents of the said admixture.

10. The method of claim 9 wherein the perlite/resin binder combination makes up substantially all of the solid contents of the said admixture.

11. A method of manufacturing a mineral product comprising the sequential steps of:
(a) forming an admixture comprising perlite and a urea-formaldehyde binder therefor, at least 75% by weight of the solids content of said admixture being composed of the perlite/urea-formaldehyde binder combination, the perlite being in the expanded form and having an initial average bulk density no greater than about 10 pounds per cubic foot, the said perlite/urea-formaldehyde binder combination containing by weight from about 50% to about 95% perlite and from about 5% to about 50% urea-formaldehyde binder where the expanded perlite is derived from an active perlite, and the said perlite/urea-formaldehyde binder combination containing by weight from about 60% to about 95% perlite and from about 5% to about 40% urea-formaldehyde binder where the expanded perlite is derived from an inactive perlite;
(b) mixing said admixture;
(c) forming a shaped product from said admixture;
(d) subjecting said shaped product to pressure to form it into its final shape, said pressure being sufficient to reduce the bulk volume of the perlite by a crushing factor of at least about:
(i) where the expanded perlite has been derived from an active perlite:
(1) $y = 6.5 - 0.26x$ where x is from about 5 to about 15
(2) $y = 3.1 - 0.035x$ where x is from about 15 to about 50
(ii) where the expanded perlite has been derived from an inactive perlite:
(3) $y = 2.3 - 0.03x$ where x is from about 5 to about 40
wherein in each of formulas (1), (2) and (3): y is the crushing factor and x is the percent by weight of urea-formaldehyde binder in the perlite/urea-formaldehyde binder combination; and thereafter,
(e) curing the urea-formaldehyde binder.

12. The method of claim 11 wherein the expanded perlite is derived from an active perlite and the said crushing factor is at least about 3.

13. The method of claim 11 wherein the expanded perlite is derived from an inactive perlite and the said crushing factor is at least about 2.5.

14. The method of claim 11 wherein the said crushing factor is at least about 4.

15. The method of claim 11 wherein the said crushing factor is from about 5 to about 10.

16. The method of claim 11 wherein the perlite has an initial average bulk density of from about 2 to about 4 pounds per cubic foot.

17. The method of claim 16 wherein the perlite has an initial average bulk density of about 3 pounds per cubic foot.

18. The method of claim 11 wherein the said admixture further includes from about 0.01% to about 0.1% of a silane coupling agent.

19. The method of claim 11 wherein the said admixture further includes a catalyst system comprising from about 0.01% to about 1.0% ammonium dihydrogen phosphate and up to about 1% phosphoric acid.

20. The method of claim 11 wherein the perlite/urea-formaldehyde combination makes up about 95% by weight of the solid contents of the said admixture.

21. The method of claim 20 wherein the perlite/urea-formaldehyde combination makes up substantially all of the solid contents of the said admixture.

22. The method of claim 11 wherein said admixture further includes at least about 20% water by weight of the total admixture.

23. The method of claim 22 wherein said water is present in the amount of from about 25 to about 35%.

24. The method of claim 11 wherein the urea-formaldehyde binder is from about 15% to about 35% by weight of the perlite/urea-formaldehyde binder combination.

25. The method of claim 11 wherein the urea-formaldehyde binder is about 10% to 20% by weight of the perlite-urea-formaldehyde binder combination.

26. A method of manufacturing a mineral product comprising the sequential steps of:
(a) forming an admixture comprising perlite and a urea-formaldehyde binder therefor, at least about 95% by weight of the solids content of said admixture being composed of the perlite/urea-formaldehyde binder combination, the said combination containing by weight from about 60% to about 90% perlite and from about 10% to about 40% resin binder, and the perlite being derived from active perlite and the perlite being in the expanded form and having an initial average bulk density of from about 2 to about 4 pounds per cubic foot, said admixture further including from about 25% to about 40% water by weight of the perlite/urea-formaldehyde combination;
(b) mixing said admixture without substantial reduction in bulk volume of the perlite;
(c) forming a shaped product from said admixture;
(d) subjecting said shaped product to pressure to form it into its final shape, said pressure being sufficient to reduce the bulk volume of the perlite by a crushing factor of at least about 4; and
(e) curing the urea-formaldehyde binder.

27. The method of claim 26 wherein the said admixture further includes from about 0.01% to about 0.1% of a silane coupling agent.

28. The method of claim 26 wherein the said admixture further includes a catalyst system comprising from about 0.01% to about 1.0% ammonium dihydrogen phosphate and up to about 1% phosphoric acid.

29. The method of claim 26 wherein the perlite/urea-formaldehyde combination makes up substantially all of the solid contents of the said admixture.

30. The method of claim 26 wherein said water is present in the amount of from about 25% to about 35%.

31. The method of claim 26 wherein the urea-formaldehyde binder is from about 15% to about 20% by weight of the perlite/urea-formaldehyde binder combination.

32. The method of claim 26 wherein the said crushing factor is from about 5 to about 10.

33. The method of claim 26 wherein the perlite has an initial average bulk density of about 3 pounds per cubic foot.

* * * * *